T. B. HARRIS & J. W. BEVERLY.
TOOLS FOR TREATING TOBACCO PLANTS.
No. 179,305. Patented June 27, 1876.
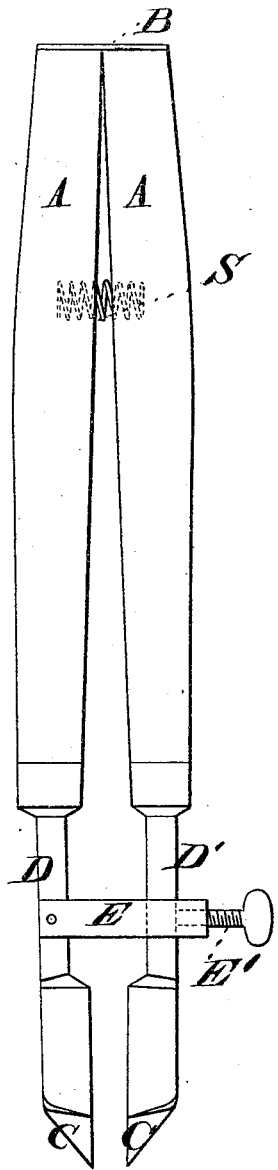
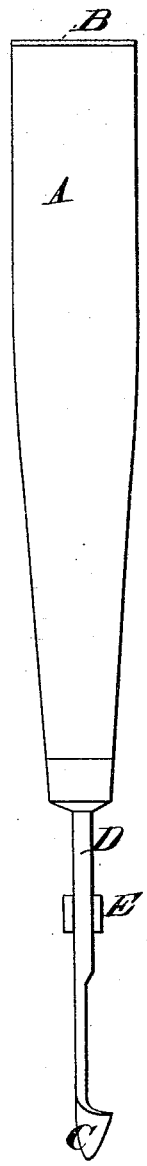

UNITED STATES PATENT OFFICE.

THOMAS B. HARRIS AND JOHN W. BEVERLY, OF LISBON, MO., ASSIGNORS OF ONE-THIRD THEIR RIGHT TO JAMES M. REYNOLDS, OF SAME PLACE.

IMPROVEMENT IN TOOLS FOR TREATING TOBACCO-PLANTS.

Specification forming part of Letters Patent No. 179,305, dated June 27, 1876; application filed May 20, 1876.

*To all whom it may concern:*

Be it known that we, THOMAS B. HARRIS and JOHN W. BEVERLY, of Lisbon, in the county of Howard and State of Missouri, have invented a new and valuable Improvement in Tools for Treating Tobacco-Plants; and we do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of our tool for treating tobacco-plants, and Fig. 2 is a side view of the same.

This invention has relation to a tool to be used in the culture of tobacco-plants; and it consists in a device for trimming the plants; and also for removing the worms from the same, as will be hereinafter explained.

In the annexed drawings, A A designate the handles of my improved device, which are preferably constructed of wood. The butt-ends of the handles are secured together by a spring-plate, B, or in lieu thereof a hinge may be used. C C designate the blades of the knives or cutters which are beveled, and the ends curved over, so that when the knives are closed together the points resemble the letter V, and have recesses underneath the curved portions. D D' designate the shanks of the knives or cutters C C. On shank D is fixed a slotted guide-bar, E, in which the shank D' is guided. Through the end of guide-bar E, a set-screw, E', is tapped for the purpose of regulating the strokes of the knives, which can be adjusted by means of this screw for adapting the instrument to any size of plants. The guide-bar E also prevents lateral strain on the spring B. Between the handles A A, and near the butt-ends of the same, is affixed a spring, S, which opens the knives when they are relieved from pressure by the hands, and holds them in a position to repeat the operation of topping the plants or removing the worms.

The operation of my device is as follows: In removing the germ of the sucker in tobacco-plants, the curved ends or bits of the knives are placed over the germ, and gently pressed downward toward the principal tobacco stalk until the bits close and sever the germ.

In topping the tobacco, the cutters are placed over the top bud, and by pressing the handles together the operation is completed.

The operation of removing the worms is accomplished by the use of the bits or nippers, without injuring the leaves or stock.

It will be observed that by the peculiar construction of my device, the operation of trimming the plants, and removing the worms therefrom, can be successfully accomplished without liability to injure the stalk, leaves, or buds of the plant.

What we claim as new, and desire to secure by Letters Patent, is—

1. The cutters C C, constructed as described, and applied to handles A A, in combination with the guide E, substantially as described.

2. In a tobacco-trimmer, substantially as described, the springs B and S, in combination with the guide E, and shanks D D of the cutters, substantially as described.

In testimony that we claim the above we have hereunto subscribed our names in the presence of two witnesses.

THOMAS B. HARRIS.
     JOHN W. BEVERLY.

Witnesses:
 ALBIN H. BERKLEY,
 CALEB P. BOBBITT.